Dec. 13, 1938.  G. A. LYON  2,139,900
ORNAMENTAL WHEEL DISK
Filed Dec. 8, 1934  2 Sheets-Sheet 1
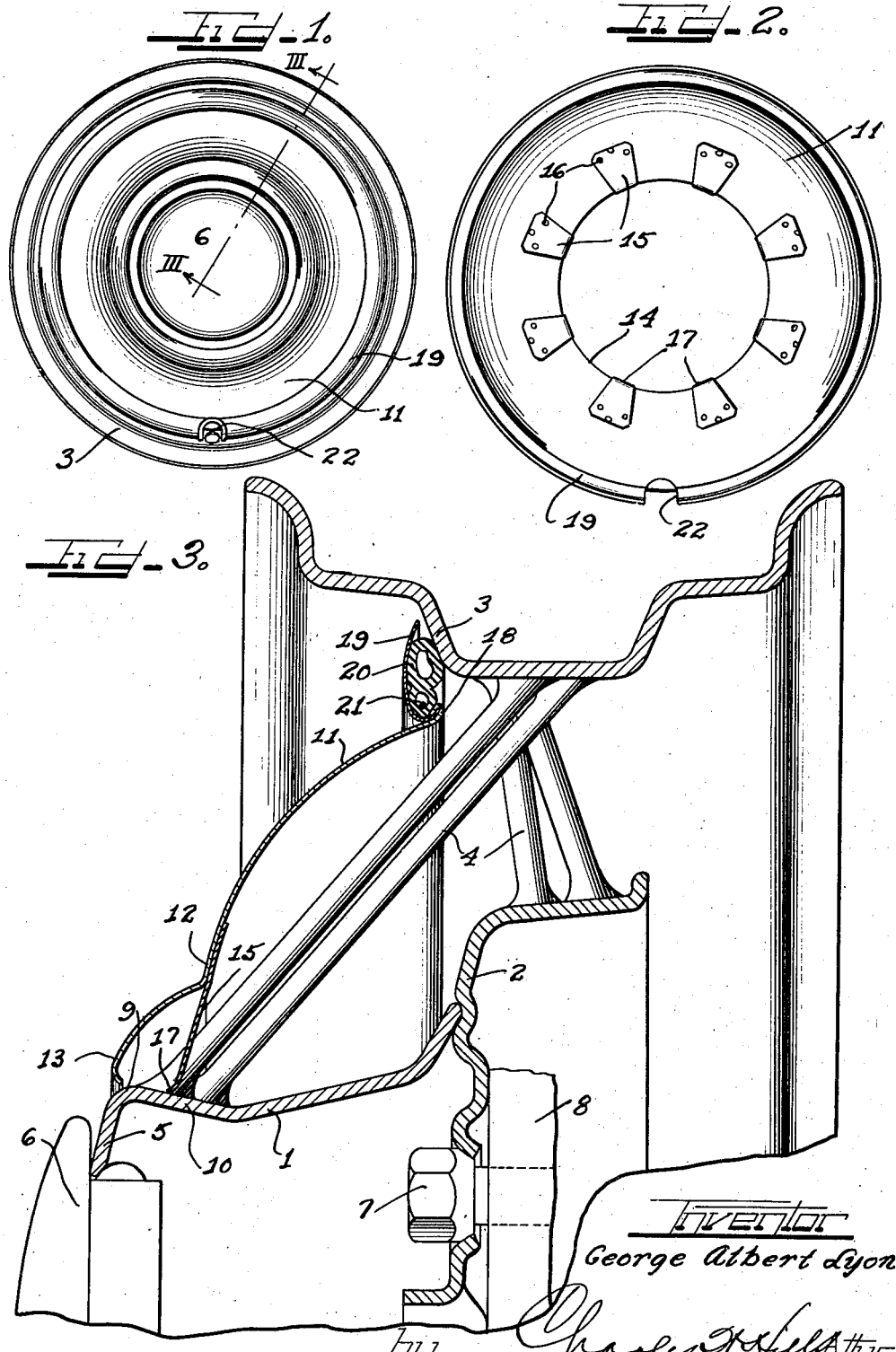

Dec. 13, 1938.    G. A. LYON    2,139,900
ORNAMENTAL WHEEL DISK
Filed Dec. 8, 1934    2 Sheets-Sheet 2
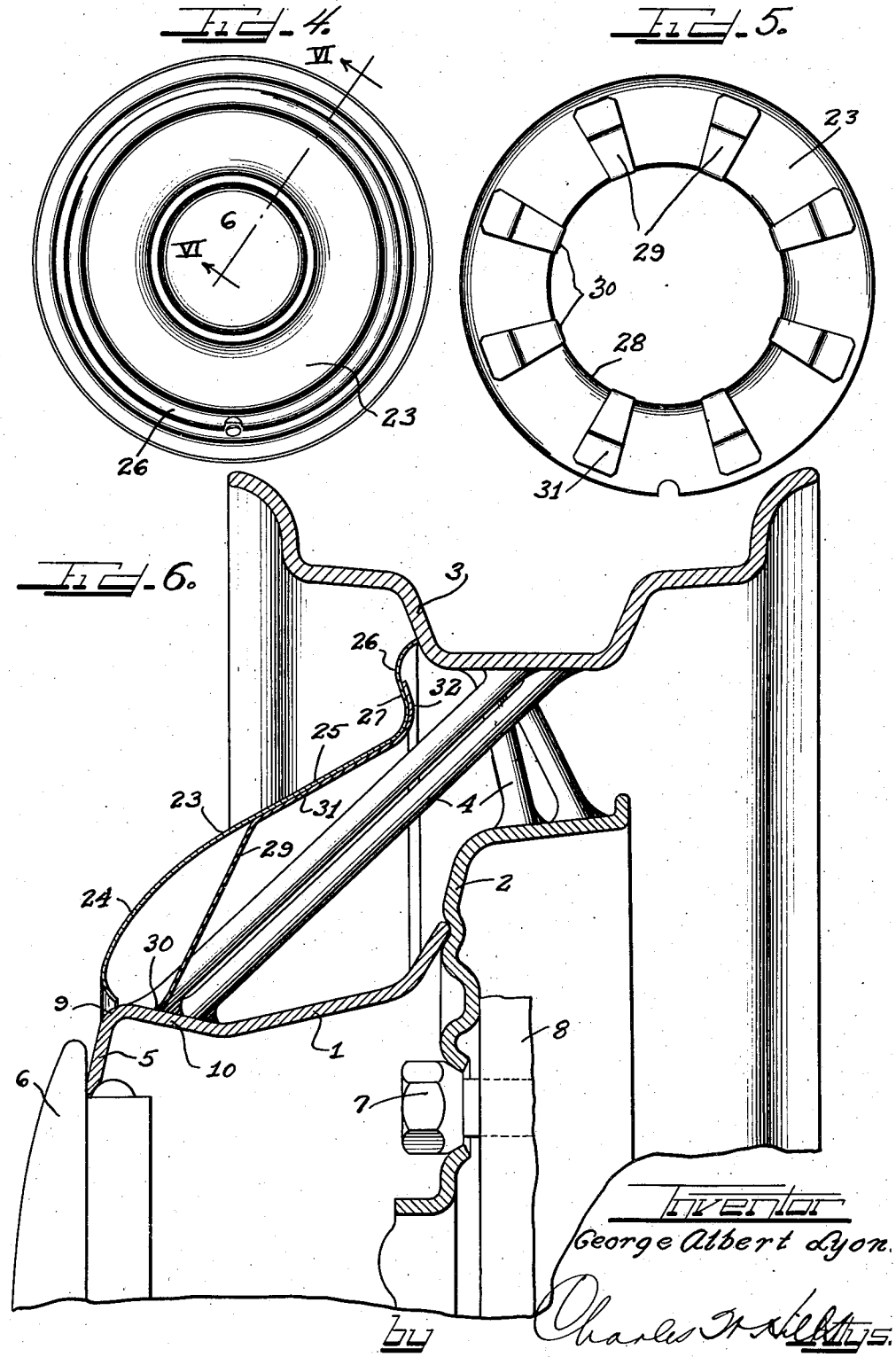

Patented Dec. 13, 1938

2,139,900

UNITED STATES PATENT OFFICE 2,139,900

ORNAMENTAL WHEEL DISK

George Albert Lyon, Detroit, Mich.

Application December 8, 1934, Serial No. 756,569

3 Claims. (Cl. 301—37)

This invention relates to improvements in ornamental wheel disks, and more particularly to wheel disks of the character used in connection with automotive vehicle wheels for disposition over the side surface of the wheel to improve the appearance thereof, although the invention will have other uses and purposes as will be apparent to one skilled in the art.

In the automotive industry, it has become desirable to provide means for giving the appearance of a disk wheel construction where a spoked wheel is used, without detracting in any manner from the benefits of utilizing a spoked wheel. Especially is this true in connection with wire spoked wheels. In such construction, the cover plate or disk element must be held securely in position, overlying properly at least a portion of the space between the hub and rim of the wheel, and it must be mounted in such a manner as to avoid rattling or drumming during use of the vehicle, automatically providing for the considerable tolerance allowed in lateral displacement between the commonly used hollow hub and the rim of the vehicle wheel.

Accordingly, it is an object of this invention to provide a cover plate or disk element for disposition between the hub and rim of a wheel, which cover plate is of extremely simple and economical construction.

It is also an object of this invention to provide a cover plate of the character set forth herein provided with securing means of a character which may be cut from sheet stock with a negligible wastage of material.

Also an object of this invention is the provision of a disk element for the side surface of a wheel having securing means associated therewith which are pressable over a portion of the wheel structure in an easy and ready manner and are so shaped as to avoid marring the surfaces over which they are pressed, the securing means being further designed so that their gripping or biting action upon the surfaces of the wheels against which they bear will be enhanced by a tendency to remove the cover plate from the wheel.

It is also an object of this invention to provide a cover element of the character described herein having a plurality of separate spring members secured to the rear surface thereof in spaced relationship to each other, each of these spring members projecting obliquely downwardly and outwardly and jointly defining substantially a circular engaging area for a surface of the wheel structure.

Still another object of the invention is the provision of a cover element of the character described, having a plurality of separate spring members each welded to a substantially flat portion of the rear surface of the cover element in such a manner as not to impair the smooth external surface of the cover.

A further object of this invention is the provision of a cover element for the side surface of a vehicle wheel having a plurality of spaced spring elements secured to the rear surface thereof jointly defining an opening for the reception of the hub of the wheel, each free projecting end of the elements being outturned at such an angle as to permit their riding over the external bulge of a hollow hub and assuming a position upon the hub behind the bulge so as to afford biting engagement with the surface of the hub upon any tendency to remove the cover element from the wheel.

Still a further object of this invention is the provision of a disk element for disposition over the side of a wheel, with improved means embodied in the element construction for cushioning engagement with the rim of the wheel.

It is also an object of this invention to provide a disk element in a simple and economical manner, which element may be mounted upon a wheel, such as an automobile wheel, at the place of manufacture, or may be subsequently purchased as an accessory and easily mounted in position by a user.

While some of the more salient features, characteristics and advantages of the present invention have been above pointed out, others will become apparent from the following disclosures.

The invention includes these and other features of construction and combinations of parts hereinafter described, and shown in preferred forms in the drawings, as more particularly indicated by the claims.

On the drawings:

Figure 1 is a side elevational view of an automotive vehicle wheel equipped with a disk element embodying principles of the present invention.

Figure 2 is an enlarged rear elevational view of the disk element seen in Figure 1, showing the same removed from the wheel.

Figure 3 is a greatly enlarged fragmentary vertical sectional view, with parts in elevation, taken substantially as indicated by the line III—III of Figure 1.

Figure 4 is a view similar to Figure 1 showing an automotive vehicle wheel in side elevation equipped with a different form of disk element embodying principles of the present invention.

Figure 5 is a rear elevational view, similar to Figure 2, of the disk element shown in Figure 4.

Figure 6 is a greatly enlarged fragmentary vertical sectional view, with parts in elevation, taken substantially as indicated by the line VI—VI of Figure 4.

As shown on the drawings:

While the present invention, in different forms, is shown herein as associated with a wheel construction embodying wire spokes between a hollow hub and a tire rim, it will be understood that the disk element may be utilized with substantially any type of wheel, including a wooden spoked wheel, or a wheel having a metallic disk or plate between the hub and rim thereof. It will be further understood that the external portion of the disc element construction herein described may be of substantially any desired configuration.

In the illustrated embodiment of this invention seen in Figures 1, 2 and 3, the invention is shown associated with an automobile wheel of a common or standard construction. In this instance, the wheel is of the spoke type and includes a hollow hub 1 connected in a well-known manner with a mounting flange member 2. A drop center tire rim 3 is connected both to the hollow hub 1 and the mounting flange 2 by means of spokes 4 in a well-known manner. In this instance, the spokes 4 are wire spokes. The front set of spokes are connected to the hub in such a way that they extend forwardly almost to the outer edge of the hub. The rear set of the spokes are connected to the wheel mounting flange 2. The hub has an inwardly turned hub flange 5 in the outer portion thereof defining an opening which may be closed by a conventional hub cap 6. The entire wheel construction may be mounted by means of bolts 7 extending through suitable apertures in the mounting flange 2 upon any desirable form of supporting element 8 which may be a spare wheel rack or a spindle flange of an axle.

As is common in hollow hub constructions, the forward or outer portion of the hub is provided with an annular hump 9 of greater diameter than a tapering portion 10 immediately therebehind. As will more fully appear later herein, this hump 9 aids to some extent in keeping the disk element in position upon the wheel, by reason of the fact that it enables the disk to ride down an incline into tighter engagement with the wheel hub during the operating of the wheel.

A cover plate or disk element 11 is associated with the wheel above described, and in this instance, it is shown as covering substantially all of the space between the hollow hub 1 and the tire rim 3. However, it will be understood that if so desired, the cover plate need not extend all of the way to the rim of the wheel, but may extend outwardly towards this rim to any desirable extent, the central securing means associated with the cover plate being ample to hold the plate securely in position, against rattling.

In this instance, the cover plate is provided with a central arcuate portion terminating at the inner part thereof in a substantially flat portion 12 which may or may not have a relatively slight curvature. Below the portion 12 is a decorative bead 13 centrally apertured as at 14 for reception of the hub 1. For holding the disk element 11 in position, a plurality of substantially flat spring members 15 are secured to the rear surface of the disk element, preferably at the substantially flat portion 12. The members 15 may be secured to the disk element in any desired manner, but are preferably attached by means of spot welding as indicated at 16, and the outer portions of these members, or the portions which are attached to the disk, preferably conform in configuration to the portion 12. In other words, adjacent this portion, these members may be of a slightly arcuate form. It is preferred to use a projection welding machine for the purpose of attaching the spring members to the disk, and one part of this projection welding machine is shaped in conformity with the external face of the disk so that after welding, reasonable buffing of the front face of the disk will result in an absolutely smooth appearance. As seen best in Figure 3, the members 15 are spaced apart a proper distance to extend readily between the spokes 4 of the wheel so as to provide an adequate hold upon the hollow hub 1 regardless of how far the spokes extend towards the outer edge of the hub.

The spring members 15 are in the nature of teeth, and extend freely across the space behind the annular bead portion 13 of the disk. The inner ends of these members are preferably arced or turned outwardly as indicated at 17, and when in position, may define, figuratively, a circle of slightly less diameter than the aperture 14 for engagement over the hub 1.

When it is desired to attach the disk to the side of a wheel, it is a simple expedient to press the disk laterally inwardly over the hub until the disk is in the proper position. The spring members 15 are sufficiently resilient so as to flex over the hump 9 in the hub and securely grip the surface of the portion 10 of the hub therebehind. The outturned ends 17 of the members tend to prevent scratching of the surface of the hub while placing the disk construction in position, and also afford biting engagement with the surface of the hub upon any tendency to remove the disk construction from the wheel. As shown in Figure 3, the construction is such that the disk may move inwardly over the hub very readily and easily without substantially injuring the surface of the hub, and the angle of the outturned portions 17 of the spring members is such as to cause these members to bite into the surface of the hub along the tapering portion 10 behind the hub 9 upon any tendency for the disk construction to move outwardly off the hub. Obviously, therefore, any tendency for the disk element to be shifted in position only augments the engagement of the spring members 15 with the hub, and the disk construction may be readily positioned in the proper location regardless of the variation in lateral displacement between the hub and rim of the wheel. The bead portion 13 of the disk element 11 effectively conceals the spring members 15 from external observation, leaving a smooth and attractive appearance for the outside of the wheel.

It will be noted that the spring members 15 are of such shape that they can be stamped or cut from a strip of sheet material with only a negligible amount of wastage of material. The members may be cut from a sheet with adjacent members facing in opposite directions, so that the only waste of material will be the negligible amount cut off when the corners of the members are rounded.

The members may be attached to the undersurface of the disk element as above described, either individually or simultaneously as may be deemed most desirable, it being a simple proposition to lay the outer edges of the strips against a substantially flat surface of the disk element and effect a welding or other joining operation.

Along the periphery thereof, the disk element 11 is provided with a reverse fold 18 (Figure 3) which clamps in position an underturned edge of a decorative bead 19. The formation of the bead together with the reverse fold 18 provides an annular groove between the bead and fold. A cushioning element is seated in this groove. In this instance, the cushioning element comprises a hollow tube 20 generally of the shape of a figure 8 with the outer portion of larger diameter than the inner portion, and made of live rubber or some other suitable cushioning material. The lower tube of the cushioning member contains a flexible rustproof wire 21, which is preferably endless and which, when the rubber tube is compressed, is forced over the reverse fold 18 in the disk element 11 and then is held in place by the lower tube of the cushioning member. The wire is of a smaller diameter than the edge or fold 18 over which it is forced by the stretching of the rubber lower tube into said groove. Accordingly, the upper tubular portion of the cushioning member 20 is left free for resilient contact with a face of the tire rim 3 when the cover construction is pressed into position. Such resilient contact effectively eliminates rattling or drumming and interferes in no manner with the flexing of the rim relatively to the hub during operation of the vehicle. Consequently, differences in size, displacement, adjustment or flexing of the wheel construction are automatically compensated for by the cover plate or disk construction.

As seen best in Figures 1 and 2, the decorative bead 19 is notched as at 22 for the accommodation of a tire valve stem, and the cushioning element 20 preferably terminates on each side of the notch 22. However, the flexible wire 21 passes by the notch 22 in the aforesaid groove formation thereby eliminating any tendency of the cushioning element to become dislodged from its proper position.

In Figures 4, 5 and 6, I have shown a disk construction of a different form, which construction does not utilize any added cushioning element for the rim engagement. In this instance, a disk element 23 is shown associated with a wheel structure of the same character as above described. This element, however, is of a different shape than that previously described and embodies an inner portion bellied outwardly as at 24. Immediately above this portion 24 the element is substantially flat as at 25, and then runs into an S-curve 26 the outer edge of which is in contact with the surface of the tire rim 3. Substantially at the central portion of the S-curve, another substantially flat area 27 occurs. Of course, the disk element is provided with a central opening 28 for reception of the hub 1 of the wheel.

On the under surface of the disk a plurality of spring members 29 are provided, these members extending across the portion behind the belly 24 and being provided with outturned ends 30 in substantially the same manner as the elements 15 mentioned above. The outer portion of each of the elements is disposed at an angle to the free portions of the element and parallel to the substantially flat part 25 of the disk as indicated at 31, and each member is also provided with a curved portion 32 engaged around the lower part of the S-curve 26 of the disk. A preferable way of attaching the spring members to the rear face of the disk is by spot welding in the region of the flat area 25 of the disk and also in the region of the flat area 27 of the disk. The welding may be done as above described so as to leave no unsightly marks upon the exterior surface of the disk construction, or any other suitable manner.

The disk construction 23 is placed in position upon a wheel in the same manner as that shown in Figures 1 to 3, inclusive, and functions in substantially the same way. The outer edge of the disk beyond the S-curve 26 contacts the rim 3 in such a manner as not to interfere with flexing of the rim relatively to the hub of the wheel, and the securement above the hub of the wheel is quite sufficient to eliminate rattling or drumming either at the point of engagement of the outer edge of the disk with the rim or at any other place in the construction.

It will be noted that the spring elements 29 may be cut from sheet stock as above explained in a manner whereby the wastage of material is negligible. It is a simple expedient to place the spring members 29 in proper position and to secure them either individually or simultaneously to the rear surface of the cover plate.

From the foregoing, it will be apparent that I have provided a cover plate or disk element construction for disposition between the hub and rim of a vehicle wheel, which construction is exceedingly simple and economical to make and use and which is very durable and efficient in operation.

I claim as my invention:

1. As an article of manufacture, a disk element arranged to cover a portion of the space between the rim and hub of a wheel, said disk having a central opening for engagement over the hub of a wheel, and a plurality of separate individual spring members secured to the rear face of said disk and about and radially outward from said wheel hub, each member projecting radially inwardly and axially outwardly from the place of securement to the disk for biting engagement with said hub.

2. As an article of manufacture, a disk element for disposition over the hub of a wheel to cover a portion of the space between the hub and rim, said element having a central aperture for receiving the wheel hub, and a plurality of substantially flat individually separate spring members joined in spaced relationship to the rear side of said element, each of said members extending radially inwardly and axially outwardly from its junction with said disk towards the wheel hub for biting engagement therewith upon a tendency to remove said element.

3. As an article of manufacture, a disk element for disposition between the hub and rim of a wheel and having a central opening for receiving the wheel hub, and a plurality of individually separate spring members each secured to a substantially flat portion of said disk element with free ends of the members projecting from said flat portion radially inwardly and axially outwardly towards the hub, each of said members having a slight forward arc on the free end thereof and being sufficiently resilient to permit pressing over the hub without scratching the surface of the hub but affording biting engagement with the hub upon a tendency to remove said element.

GEORGE ALBERT LYON.